United States Patent [19]

Krall

[11] Patent Number: 5,429,789

[45] Date of Patent: Jul. 4, 1995

[54] PLASTIC CONTAINER WITH SELF-DRAINING FEATURE

[75] Inventor: Thomas J. Krall, Toledo, Ohio

[73] Assignee: Owens-Illinois Plastic Products Inc., Toledo, Ohio

[21] Appl. No.: 60,369

[22] Filed: May 11, 1993

Related U.S. Application Data

[60] Continuation of Ser. No. 840,653, Feb. 20, 1992, abandoned, which is a continuation of Ser. No. 620,239, Nov. 29, 1990, abandoned, which is a division of Ser. No. 401,517, Aug. 29, 1989, Pat. No. 4,989,757, which is a continuation of Ser. No. 160,559, Feb. 25, 1988, abandoned.

[51] Int. Cl.⁶ .................. B29C 49/04; B29C 49/76
[52] U.S. Cl. ..................... 264/533; 425/525
[58] Field of Search ........... 264/523, 533, 537, 540; 425/525

[56] References Cited

U.S. PATENT DOCUMENTS

| | | |
|---|---|---|
| 2,601,039 | 6/1952 | Livingstone . |
| 2,710,987 | 6/1955 | Sherman . |
| 2,743,844 | 5/1956 | Livingstone . |
| 2,763,403 | 9/1956 | Livingstone . |
| 2,793,790 | 3/1956 | Kahler . |
| 2,804,654 | 9/1957 | Sherman . |
| 2,911,673 | 11/1959 | Soubier . |
| 3,009,196 | 11/1961 | Hagen ................... 264/533 |
| 3,029,471 | 4/1962 | Adams . |
| 3,086,249 | 4/1963 | Nelson et al. . |
| 3,115,682 | 12/1963 | Soubier et al. . |
| 3,303,249 | 2/1967 | Strauss ................... 264/533 |
| 3,537,676 | 11/1970 | Miller . |
| 3,583,031 | 6/1971 | Kader et al. . |
| 3,833,150 | 9/1974 | Visser-Patings . |
| 3,919,374 | 11/1975 | Komendowski . |
| 4,337,025 | 6/1982 | Pagels et al. . |
| 4,518,558 | 5/1985 | Anway et al. ................. 425/525 |
| 4,550,862 | 11/1985 | Barker et al. . |
| 4,578,028 | 3/1986 | Dirksing et al. . |
| 4,616,759 | 10/1986 | Mahler . |
| 4,640,855 | 2/1987 | St. Clair . |
| 4,671,421 | 6/1987 | Reiber . |
| 4,706,829 | 11/1987 | Li . |
| 4,929,410 | 5/1990 | Meyer et al. . |
| 5,020,692 | 6/1991 | Darr . |
| 5,108,009 | 4/1992 | Davidson et al. . |

FOREIGN PATENT DOCUMENTS

| | | |
|---|---|---|
| 1125509 | 10/1956 | France . |
| 244327 | of 0000 | Germany . |
| 188590 | 4/1937 | Switzerland . |
| 678883 | 9/1952 | United Kingdom . |
| 2094220 | 9/1982 | United Kingdom . |

*Primary Examiner*—Catherine Timm

[57] ABSTRACT

A self-draining container is disclosed. The container includes a body and a neck, wall and dispensing spout extending upwardly from a body opening. The dispensing spout has a diameter equal to or greater than the diameter of the neck. The wall surrounds the dispensing spout which extends above the top of the wall. A web joins the wall and the dispensing spout to form a drain channel. A drain opening through the spout is defined adjacent the channel for draining fluid from the channel into the container body. A cap having a depending skirt defining threads mates with threads on the container wall to close the container.

9 Claims, 5 Drawing Sheets

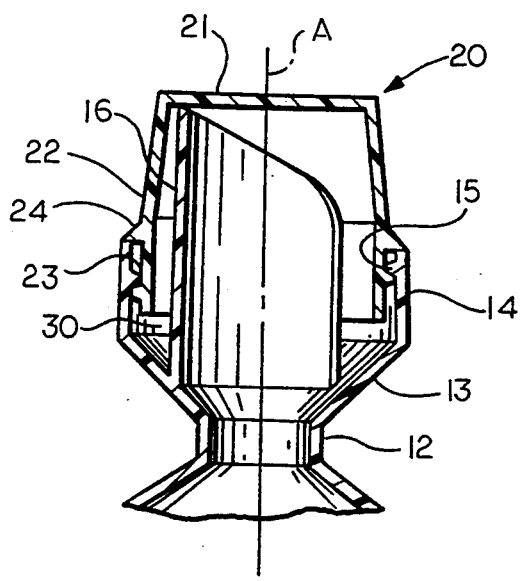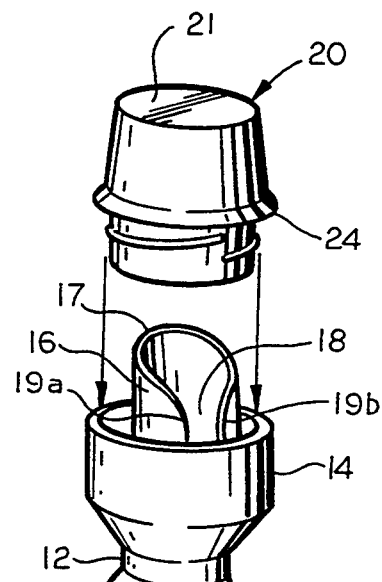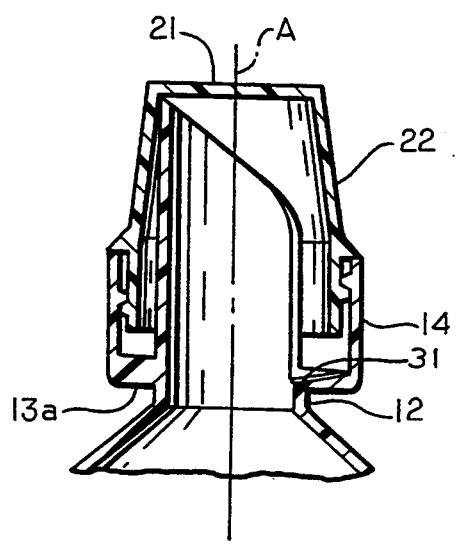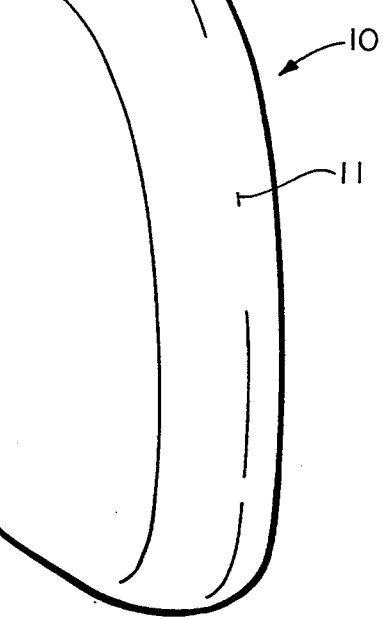
FIG. 2
FIG. 3
FIG. 1

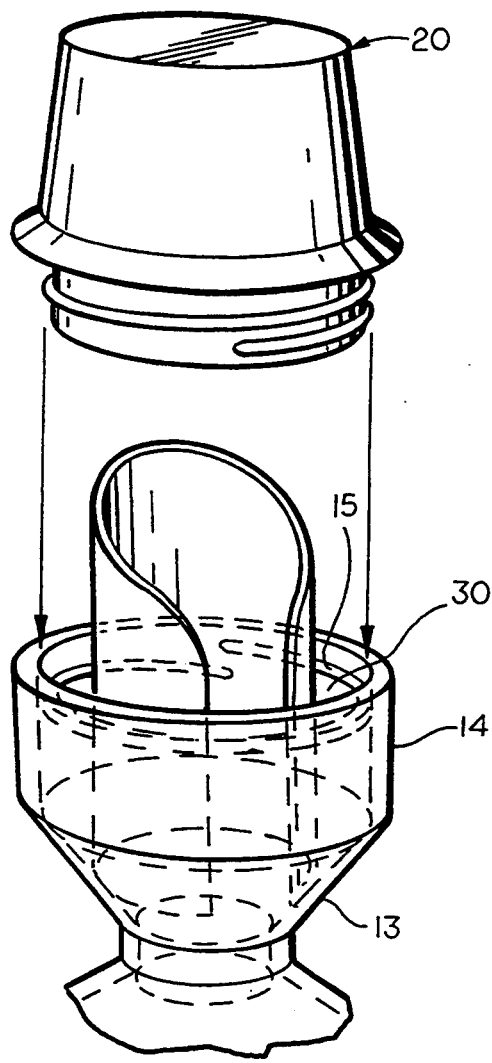
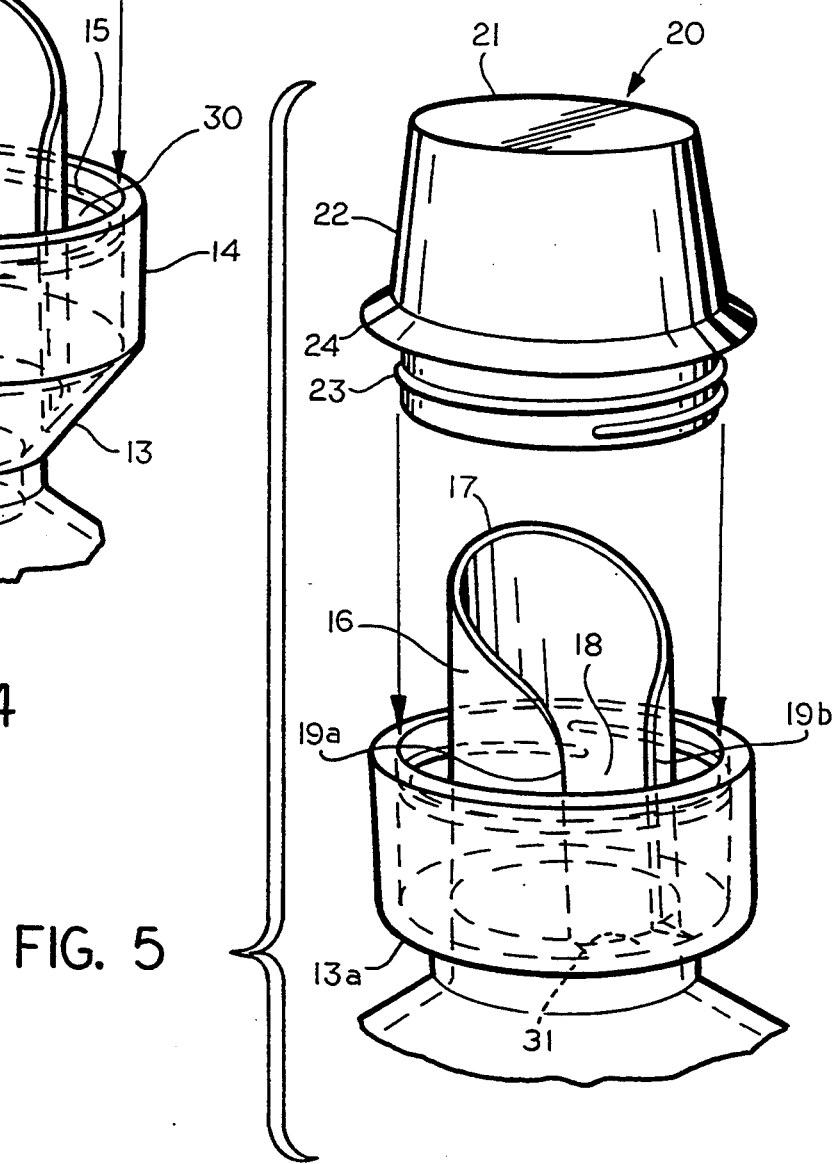
FIG. 4
FIG. 5

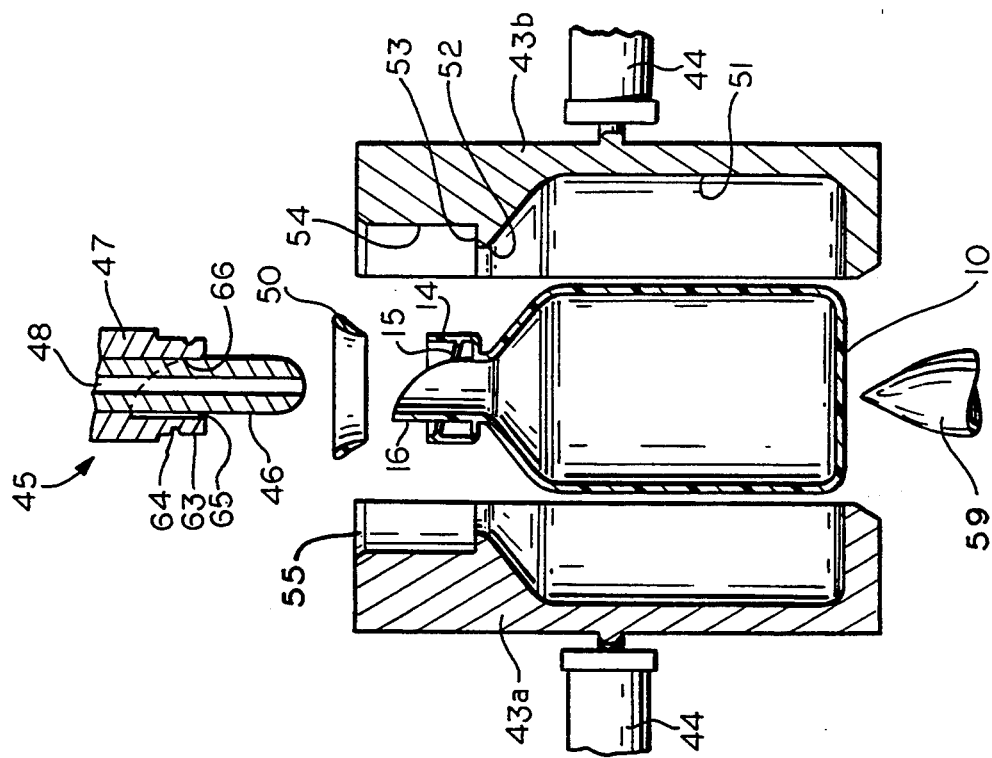
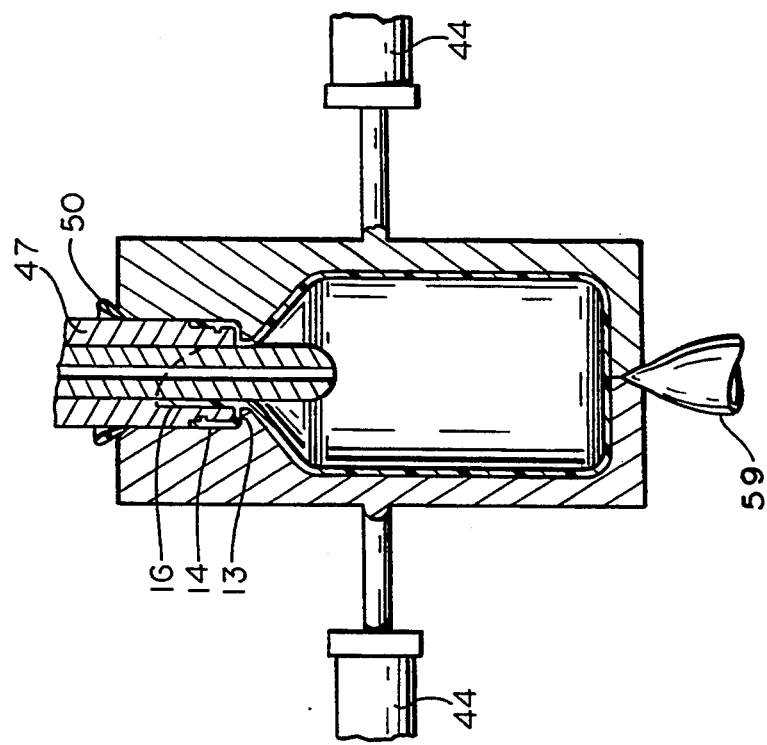
FIG. 8
FIG. 7

PLASTIC CONTAINER WITH SELF-DRAINING FEATURE

This is a continuation of application Ser. No. 7/840,653 filed on Feb. 20, 1992, now abandoned, which is a file wrapper continuation of application Ser. No. 07/620,239 filed Nov. 29, 1990 (abandoned) which is a divisional of application Ser. No. 07/401,517 filed Aug. 29, 1989 (now U.S. Pat. No. 4,989,757) which is a continuation of application Ser. No. 07/160,559 filed Feb. 25, 1988, (abandoned).

BACKGROUND ART AND SUMMARY OF THE INVENTION

This invention relates to plastic containers and more particularly to a one-piece plastic container having a drain back feature.

In dispensing liquid from containers wherein only a portion of the contents of the container are used at any one time as is the case with many products such as liquid detergents and bleaches, the consumer is concerned with the messiness which occurs from drops of the liquid contents draining down the neck and side of the container upon completing of pouring. Thus, when a bottle having an upper neck is turned from its normal upright storage position to an inverted dispensing position and then back to its upright position, a few drops of such liquid will invariably drain down the outside of the neck of the container. A number of prior art container designs have disclosed various features for capturing such excess fluid and causing it to drain back into the container rather than drip down the neck and side. Among such prior art containers are ones disclosed in U.S. Pat. Nos. 4,640,855; 4,671,421; and 4,550,862. Also pertinent are other types of dispensers cited as prior art in the above patents.

Each of the containers disclosed in the foregoing patents require either a multiplicity of pieces which are assembled in a post molding operation in order to provide a drain back feature or in the case of 4,640,855 a reshaping operation to reposition the spout. Thus, in addition to the closure for sealing the container, each of the containers disclosed in the above patents have a separately molded element affixed to the container which cooperates with some element or elements thereof to form a drain back feature. In contrast, the container of the present invention incorporates the drain back feature as an integral part of the container, formed during the container molding operation. The only other element required for a complete package is a closure for sealing the container. Among other advantages of the container of the present invention is that it is much more economical to produce than is a container requiring multiple pieces. Thus, in multiple-piece containers having self-draining features, separate molding operations are required for molding the individual elements and then a separate assembly operation is required to assemble the elements to form the self-draining container.

Accordingly, it is an object of the present invention to provide a new and novel one-piece self-draining container.

It is a further object of the present invention to provide a self-draining container which can be molded on a single machine and which requires no assembly operations.

It is a further object of this invention to provide a method and apparatus for forming a one-piece self-draining container.

It is a further object of the present invention to provide a one-piece self-draining container which can be produced on any one of several different types of blow molding machines utilizing different methods of molding.

Finally, it is an object of the present invention to provide a package including a one-piece self-draining container and a closure for sealing such container.

Other objects of the invention will become obvious from the following description.

DESCRIPTION OF THE DRAWINGS

FIG. 1 is a perspective view showing one embodiment of a container of my new design and further showing a closure removed therefrom.

FIG. 2 is a cross-sectional view of the top portion of my new self-draining package showing the closure in combination with the container.

FIG. 3 is a cross-sectional view of a modified embodiment including the closure and container.

FIG. 4 is an exploded perspective view of the top portion of the container closure combination shown in FIG. 2.

FIG. 5 is an exploded perspective view of the embodiment of the container closure combination shown in FIG. 3.

FIGS. 7 and 8 are views showing the various other steps in molding a container on a blow molding machine of the type shown in FIG. 6.

DESCRIPTION OF THE EMBODIMENT

Figure 6:
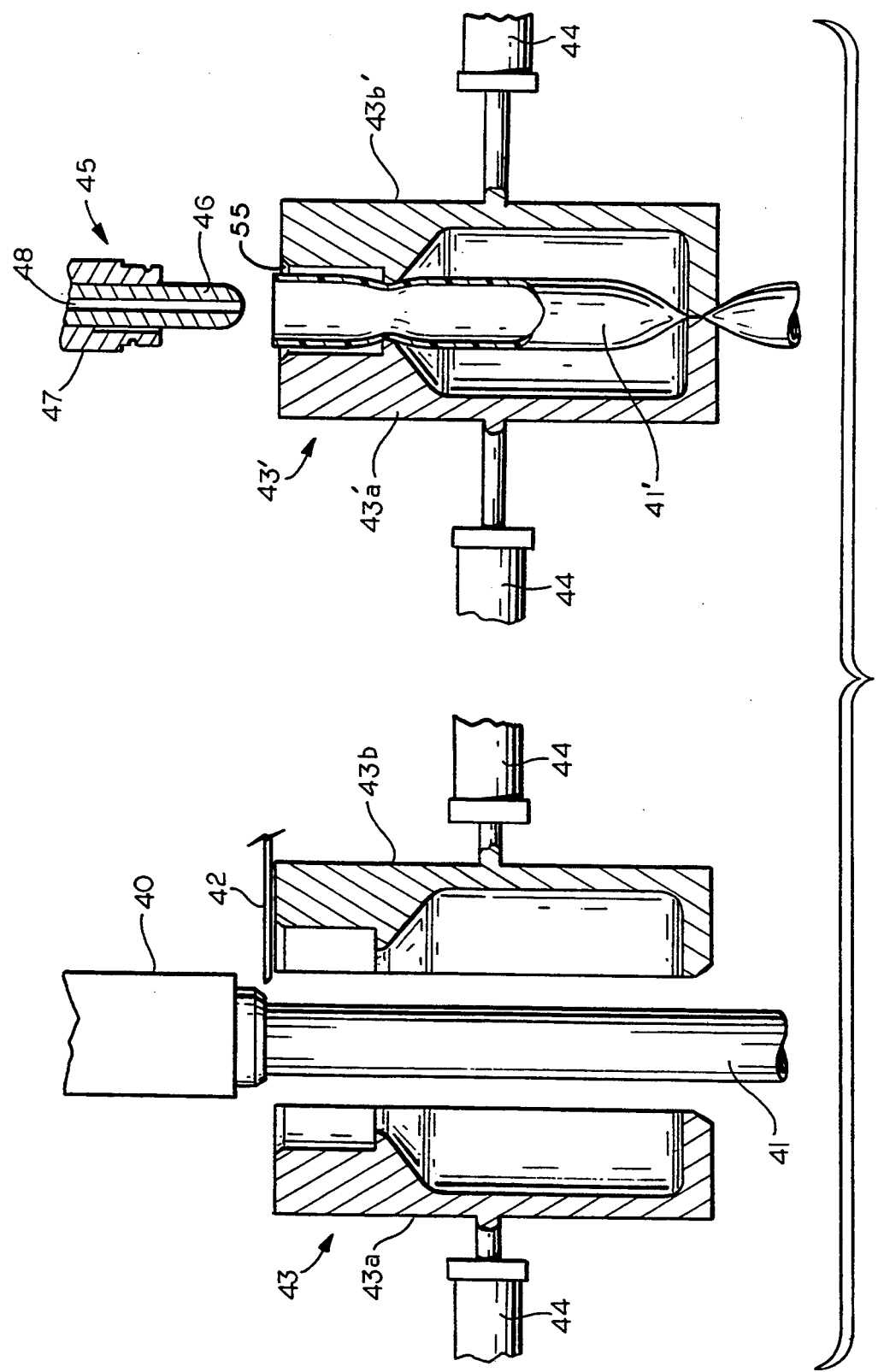
FIG. 6 is a schematic view showing a common type of blow molding machine for forming plastic containers which could be used for molding the container of the present invention in one step of its operation.

Referring now to FIGS. 1-5, the self-draining container of the present invention comprises a container generally designated 10 having a body portion 11 and a neck 12 at the upper end of such body portion. Extending outwardly from the upper portion of the neck 12 is a web member which may be inclined upwardly and outwardly as shown by the numeral 13 in FIGS. 1, 2 and 4, or may extend radially outwardly at right angles to the axis A of the neck as shown by the numeral 13a in FIGS. 3 and 5. Extending upwardly and generally parallel to the axis A of the neck is an annular wall 14 which has molded on the interior surface thereof threads 15 suitable for retaining a closure 20 adapted to seal the container.

The closure 20 has a top 21 and an annular skirt 22 depending therefrom. The lower portion of the skirt 22 has threads 23 engageable with the threads 15 of annular wall 14. If desired, an annular bead or other well-known closure retention means could be provided in lieu of the threads. If threads are utilized, the annular wall 14 and the lower portion of skirt 22 will be cylindrical in shape. However, if beads or other type of closure retention features are utilized, the annular wall 14 and the skirt 22 could be in the shape of a rectangle, oval or other configuration. Extending radially outwardly from the skirt 22 above the threads 23 is a ledge 24 adapted to seat against the top of the annular wall 14 to seal the container when the respective threads 23 and 15 are fully engaged.

Located within the annular wall 14 is a spout 16 which extends upwardly beyond the top of the annular wall 14, ending in an upper edge 17. In the embodiment shown in FIGS. 1, 2 and 4, the spout 16 extends upwardly from the web portion 13 and has a larger opening than the opening of the neck 12. In the embodiment shown in FIGS. 3 and 5, the spout 16 has an opening which is the same size as the neck 12 and extends upwardly from and in alignment with the neck 12. Thus, the spout 16 is located above and at least partially encircles the neck 12 so that, upon tipping the container to a dispensing position, as the spout approaches a horizontal or inverted position to dispense fluid contents, the fluid will flow through the neck 12 to the spout 16 and over the upper edge 17 of such spout. In the embodiment shown in FIGS. 1, 2 and 4, the fluid will flow across the lower portion of the web 13 before reaching the spout 16.

The spout 16 and neck 12 preferably have circular cross-sectional configurations; however, other cross-sectional configurations could be utilized. In the self-draining container of the present invention, the opening of the spout should be at least as large as the opening of the neck and it could be larger. Thus, if the neck and spout had openings with circular cross-sectional configurations, the diameter of the spout 16 should be equal to or greater than the diameter of the neck 12. This design permits the container to be molded on a number of different types of blow molding machines which are well-known to persons skilled in blow molding. This will become readily apparent from subsequent description of apparatus and methods for producing such self-draining containers.

Preferably, the spout 16 extends circumferentially at least 180° but less than 360° so that a gap 18 is formed by opposite edges 19a and 19b.

The exterior surface of the spout 16 cooperates with the interior surface of the annular wall 14 and the web 13 to form a channel 30. Communication from the channel 30 to the body portion 11 of the container may be had through the gap 18. Thus, following dispensing of fluid from the container and inverting the container back to its normal upright position, a small amount of the fluid which has flowed over the upper edge 17 of spout 16 will flow down the interior and exterior side walls of the spout. That portion of the fluid which flows down the interior wall of the spout will, of course, flow directly into the body portion 11 of the container 10. That portion of the fluid which flows down the exterior surface of the spout will be captured in the channel 30 and flow around the channel 30 until it reaches the gap 18 and will flow through the gap 18 back into the body portion of the container. Although it is possible for the spout to extend a full 360°, this is not preferred as it would then be necessary to perform a post molding operation to form an aperture in the side wall of the spout 16 at its lower end so that fluid could flow from the channel 30 to the body portion 11 of the container.

In the embodiment shown in FIGS. 3 and 5 in which the web 13 extends radially outwardly, such web 13a will be generally horizontal when the container is in its upright storage position. If desired, a tapered notch 31 may be provided in the upper surface of the web 13 in alignment with the gap 18 to help promote drainage from the channel 30 to the body portion.

Referring now to FIGS. 6-8, there is shown schematically a common type of blow molding machine used in the plastic bottle industry. These types of machines utilizing the overall molding motions depicted in FIGS. 6-8 are manufactured by a number of companies including Bekum Maschinen-fabriken GmbH of West Berlin, Krupp Kautex Maschinenbau of Bonn, West Germany and Battenfeld Fischer of Lohmar, West Germany, and are disclosed in various U.S. patents including U.S. Pat. No. 3,583,031.

Such blow molding machines include an extrusion head 40 connected to an extruder (not shown) which melts plastic material, typically high density polyethylene or polyvinylchloride or polypropylene and forces it through the extrusion head 40 to form a continuously extruded length of tubing or parison 41. The tubing 41 is severed from the extrusion head 40 by a knife 42 or heated wire. The parison 41 is grasped by one of two sets of blow molds 43 as the mold halves 43a and 43b close therearound upon actuation of hydraulic cylinders 44. As shown in FIG. 6, a second set of blow molds 43' with mold halves 43a' and 43b' may be provided.

In FIG. 6, the closed mold 43' with a previously extruded parison 41' clamped therein has been moved by means not shown from a position beneath the extrusion head 40 to a position remote from the extrusion head in order to permit the oncoming length of tubing to be continuously extruded. As shown in FIG. 6, it was moved to a position beneath a first blow head 45 having a blow pin 46 which is sized to conform to the interior diameter of the neck 12. Encircling the blow pin is a combination cutting and compression molding sleeve 47. After the mold 43' with the enclosed parison 41 is positioned beneath the blow head 45, the blow pin 46 is actuated downwardly and inserted into the open end of the parison 41 to compression mold the plastic to form the neck 12. The sleeve 47 moves downwardly with the blow pin 46 to compression mold the spout 16, web 13 and annular wall 14 of the container and to sever the excess plastic or waste 50. Immediately thereafter, air is introduced through a passageway 48 in the blow pin to expand the tubing into conformity with the cavity of the mold 43 and to form the container 10. This is best seen in FIG. 7. Means not shown removes the waste tail 59 from the bottom. Following the blowing step, the mold halves 43a' and 43b' are opened and the container 10 is removed.

As is well-known to persons skilled in blow molding familiar with these types of machines, a second blow head may be positioned on the other side of the extrusion head 40 from the blow head 45. After the blow mold 43 closes around the length of tubing positioned between its open halves, and the other blow mold 43' opens and ejects the newly formed container, both sets of blow molds are shifted (to the left for the sequence shown in FIG. 6 by means not shown) so that the open hold halves 43a' and 43b' are positioned beneath the extrusion head 40 to grasp the next length of tubing 41 and the other blow mold 43 closed around the previously extruded length of tubing is positioned beneath the second blow head where the molding steps will be repeated.

Both sets of blow molds 43 and 43' include a body forming wall portion 51 conforming to the desired configuration of the body portion 11. The wall portion 51 terminates in a restriction 52 having a size when the mold halves are closed equal to the exterior size of the neck 12 of the container 10. Extending outwardly from the restriction is a ledge 53 which forms the exterior surface of the web 13 for the embodiment shown in FIG. 3. As will be appreciated, the ledge 53 may be horizontal or tapered upwardly depending on whether it is desired to have the web extend radially outwardly from the neck as shown at 13a the embodiment of in FIG. 3 or tapered at an upward angle as shown at 13 in the embodiment of FIGS. 1, 2 and 4. Finally, the mold halves have an upwardly extending wall portion 54 which is preferably cylindrical in configuration when the mold halves 43a and 43b are closed, and which forms the outer surface of the annular wall 14. Preferably, the cylindrical wall 54 will terminate at an outwardly and upwardly tapered lead-in portion 55.

As previously mentioned, the blow pin 46 and sleeve 47 cooperate with the blow mold to compression mold the neck, spout, web and annular wall of the container. The sleeve 47 has a diameter sized to fit snugly within the cylindrical wall 54 when the mold halves 43a' and 43b' are closed so that as it moves downwardly into contact with the wall, it will function to sever the excess plastic or waste 50.

The lower end of the sleeve 47 has a reduced diameter shown at 63 and a groove 64 for forming the interior wall and thread 15, respectively, of the annular wall 14.

Additionally, the sleeve 47 has a cut out 65 on its interior wall surface which cooperates with the exterior wall of the blow pin 46 to form the spout 16. In the embodiment shown in FIGS. 6, 7 and 8 the spout 14 is being formed with a diameter which is equal to the interior diameter of the neck 12. The configuration of the cut out 65 will, of course, depend upon the desired configuration of the spout 16. As can be readily seen from FIG. 8, the cut out portion 65 slopes down and terminates at the lower end 66 and does not extend completely around the circumference sleeve 47 so that the edges of the cut out toward the lower end of the sleeve functions to form the edges 19a and 19b of the spout.

Figure 9:
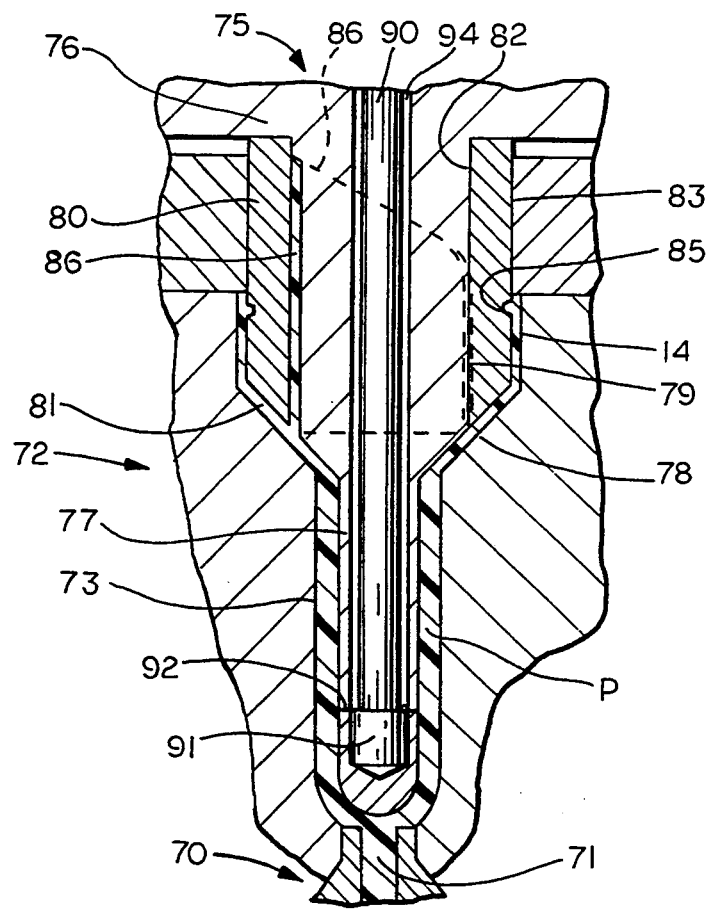
FIG. 9 is a cross-sectional view taken through an extrusion die and an injection mold of a different type of blow molding machine which could be used to form a container of my present design.

Another type of blow molding machine which could be utilized to form the container of the present invention is a blow molding machine well-known in the industry as an injection blow type blow molding machine. Blow molding machines of this type include ones manufactured by Jomar Manufacturing of Brigantine, N.J. and Nissei of Toyko, Japan. In these types of machines, the entire parison from which the container is blown is injection molded in a mold cavity defined by an interior blow head assembly and an exterior injection mold. A portion of this type of blow molding machine for injection molding the parison is shown in FIG. 9 and includes an extrusion die 70 having an orifice 71 through which heated thermoplastic material may be forced. An injection mold 72 having a cavity 73 conforming to the desired exterior surface of the parison cooperates with a blow head assembly 75 to define a mold cavity having a configuration as desired for the parison. The blow head assembly 75 is moveable into and out of the cavity 73 of the injection mold 72 and the entire combination of the injection mold 72 and the blow head assembly 75 are moveable to a position adjacent the orifice 71 and, when so positioned are able to receive the plastic material therein upon actuation of a ram or extruder (not shown) to force material through the aperture 71 to form a parison P as is well-known in the art. Following injection molding of parison P, the blow head assembly 75 with the injection molded parison is removed from the injection mold and transferred to a blow mold (not shown) which closes around the parison. The parison is then expanded in the blow mold cavity to form the container 10.

The blow head assembly includes an elongated blow pipe 76 having a tapered lower end portion 77 which cooperates with the wall 73 of the injection mold 72 to form the body portion of the parison P from which the body portion 11 of the bottle is blown. Extending upwardly and outwardly from the tapered lower end portion 77 is a wall section 78 which forms the upper surface of the web member 13 of the container embodiment shown in FIGS. 1, 2 and 4. As will be readily appreciated the specific configuration of the blow head assembly 75 and injection mold 72 may be configured to produce web and spout portion such as that shown in the embodiment of FIGS. 2 and 4. The upwardly and outwardly sloping wall portion 78 merges into an enlarged portion 79 of the blow pipe 76.

Telescoped around the enlarged portion 79 is a sleeve 80 which has a tapered lower portion 81 and cylindrical inner and outer walls 82 and 83 respectively. The tapered lower portion 81 of the sleeve 80 forms the interior surface of the upper portion of web 13. The lower portion of the outer wall 83 cooperates with the mold 72 to define the cavity in which the annular wall 14 is molded. A thread recess 85 is formed in the outer wall 83 to form the threads 15 of the container 10.

The enlarged portion 79 has a cut out 86 extending around a major portion and having a configuration suitable for forming the desired shape of the spout 16. The spout is formed in the cavity defined by the cut out 86 and the interior wall 82 of the sleeve 80.

The blow pipe 76 has a hollow center in which is positioned an elongated rod 90 connected to an enlarged nob 91 at the lower end. The tapered lower end portion 77 of the blow pipe 76 is split at 92. This permits the rod to move axially downwardly when the blow head assembly 75 and parison P are positioned in a blow mold. The elongated rod 90 is smaller than the hollowed portion of the blow pipe 76 and cooperates therewith to define a passageway 94. Thus, when in the blowing position, pressurized air may be introduced through the passageway 94 and then through a gap formed at the split 92 when the elongated rod 90 is moved downwardly to inflate the parison P thereby blow molding the container.

Figure 10:
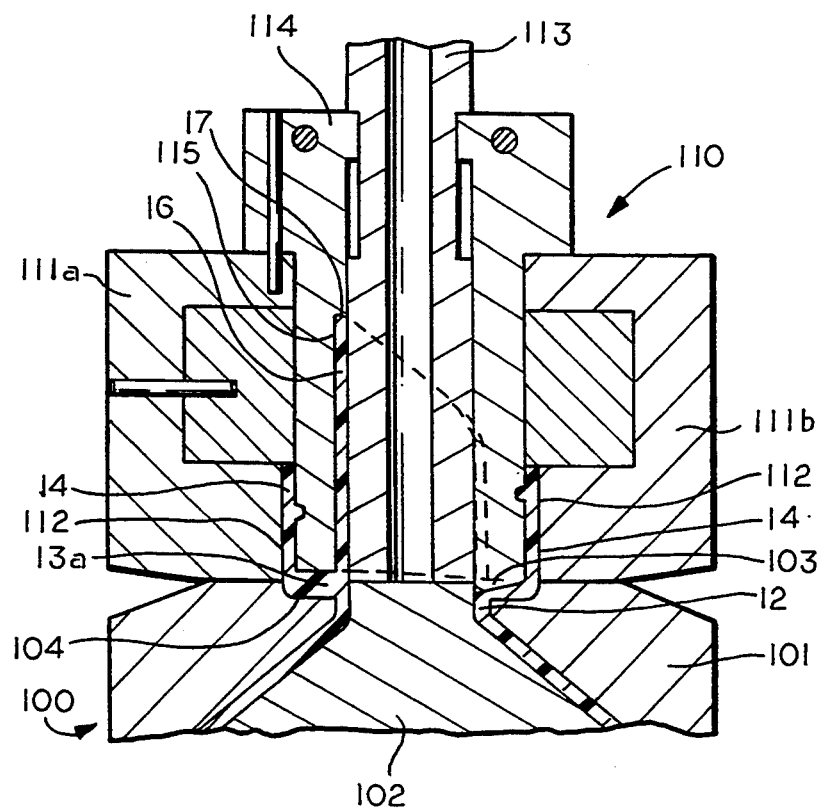
FIG. 10 is a cross-sectional view taken through an extrusion die and an injection mold of another type of molding machine which could be used to form a container of the present invention.

Referring now to FIG. 10, there is shown a portion of another type of blow molding machine which may be utilized for forming a container of the present invention. As shown in FIG. 10, a container of the embodiment of FIGS. 3 and 5 is molded; however, the embodiment of the container shown in FIGS. 1, 2 and 4 could also be molded utilizing this type of blow molding machine and process. The overall process for blow molding containers according to this method is disclosed in Sherman, U.S. Pat. No. 2,804,654, which is incorporated herein by reference. This type of blow molding may be characterized as injection-extrusion blow molding and is used by the assignee of the present invention and others with a machine designated as a BC-3 machine.

In the method utilized by the BC-3 machine, the upper neck or finish portion of the container is first injection molded in an injection mold. Upon completion of the injection molding step, the injection mold is raised from the orifice of the injection die head while a length of heated and plasticized tubing is extruded from the die head. The tubing is connected to the injection molded finish and is drawn upwardly as the tubing is extruded. After the proper length of tubing has been extruded, blow mold halves close around the tubing and air is introduced through the injection mold assembly to expand the tubing in the closed mold to form the remainder of the container. These steps are shown and described in U.S. Pat. No. 2,804,654.

In FIG. 10 the extrusion die is designated by the numeral 100 and includes a bushing 101 and mandrel 102 which cooperate to define an orifice 103 through which the heated and plasticized material is expelled. As shown, the bushing has a recessed area 104 which defines the lower portion of the web 13a of the container embodiment as shown in FIGS. 3 and 5. Alternatively, the bushing 101 could be formed without the recess 104 with its entire surface lying in the same plane as the upper end of mandrel 102. In that case, the lower end of the sleeve 114 will be shorter and spaced from the upper surface of bushing 101 and cooperate therewith to form web 13a. Also shown is a moveable neck ring assembly 110 which is mounted (by means not shown) for movement downwardly into engagement with the orifice 103 during the injection molding step and for movement upwardly during the extrusion step to draw the oncoming tubing away from the orifice 103. The neck ring assembly 110 includes neck ring halves 111a and 111b which can open and close radially and which have interior wall portions 112 against which the exterior surface of the annular wall 14 of the container is molded. Also included is a core pin 113 having a passageway extending longitudinally therethrough through which pressurized air may be introduced into the extruded tubing after such tubing is enclosed within the blow mold to thereby expanding the tube in the blow mold and form the body of the container. The core pin 113 forms the interior surface of the spout 16 of the container.

A split sleeve 114 encircles the core pin 113 and has a recess 115 of a configuration to form the upper edge 17 and outer surface of the spout 16. The lower exterior portion of the sleeve 114 forms the interior surface of the annular wall 14 and has a thread recess 116 in which the threads 15 are molded. The lower end of the sleeve forms the upper surface of the web 13b.

As will be appreciated to those skilled in the art, the container of the present invention and the method and apparatus for molding it may have numerous modifications in configuration and shape styles without departing from the scope of the following claims.

I claim:

1. A method for molding one-piece plastic self-draining containers from a moldable parison having first and second ends comprising the steps of:
   (a) compression molding said first end using a first mold in one molding operation to form
      (i) a neck defining an opening having a circular cross-sectional configuration of predetermined diameter,
      (ii) a web extending outwardly from the upper portion of said neck,
      (iii) a spout extending upwardly from said web, said spout being a section of a cylinder having an internal diameter at least as great as said predetermined diameter, said spout positioned above and partially encircling said neck, and
      (iv) an annular wall encircling said spout in spaced relationship extending upwardly from said web, said web, spout and annular wall cooperating to define (A) a channel for receiving liquids draining down the outside of said spout following dispensing and (B) communication means between said channel and said neck opening,
   (b) maintaining the remainder of said moldable parison integral and in situ with the lower end of said neck, said moldable parison being positioned within a blow mold while retaining the portion molded in step (a) engaged with said first mold; and,
   (c) expanding said moldable parison to form a body portion integral and in situ with and depending from said neck.

2. The method as defined in claim 1, wherein said moldable parison is formed by extrusion.

3. The method as defined in claim 1, wherein said spout is formed with said internal diameter larger than said neck opening predetermined diameter.

4. The method as defined in claim 1, wherein said spout is formed with said internal diameter the same size as said neck opening predetermined diameter.

5. A process for forming a one-piece self-draining plastic container having a body portion and an integrally formed dispensing portion including an upwardly extending dispensing spout having a circumferential extent less than 360° defining an opening, a web joined to and extending outwardly from the lower end of said dispensing spout, and a cylindrical wall joined to and extending upwardly from said web spaced outwardly of and encircling said dispensing spout, said dispensing spout, said cylindrical wall and said web cooperating to define a channel into which liquid draining down the outside of said dispensing spout may be captured, said spout opening communicating with said body portion and permitting liquid in said channel to flow into said body, comprising the steps of:
   (a) providing a length of heated and plasticized thermoplastic material, said length having at least one end open;
   (b) closing partible mold halves about said length while maintaining said one end open;
   (c) inserting into said open end a blow pin assembly to compression mold
      (i) said spout in the form of a section of a cylinder having a predetermined diameter;
      (ii) said wall;
      (iii) said web; and
      (iv) said neck in the form of a cylinder having a diameter no greater than said predetermined diameter; and
   (d) expanding said length in said closed mold halves to form a body portion integral and in situ with said neck.

6. A process for forming a one-piece self-draining plastic container having a body portion and an integrally formed dispensing portion including an upwardly extending dispensing spout having a circumferential extent less than 360° defining an opening, a web joined to and extending outwardly from the lower end of said dispensing spout, and a cylindrical wall joined to and extending upwardly from said web spaced outwardly of and encircling said dispensing spout, said dispensing spout, said cylindrical wall and said web cooperating to define a channel into which liquid draining down the outside of said dispensing spout may be captured, said spout opening communicating with said body portion and permitting liquid in said channel to flow into said body portion, comprising the steps of:
(a) providing
  (i) an interior mold assembly having an interior core pin, a sleeve encircling said core pin and cooperating therewith to define a cavity conforming to the desired configuration of said spout; and
  (ii) an exterior mold assembly cooperating with said sleeve to define a cavity conforming to the desired configuration of said cylindrical wall and said web;
(b) extruding a length of heated and plasticized thermoplastic material, said length having at least one end open;
(c) closing said exterior mold assembly around said length while maintaining said one end open;
(d) inserting into said open end said interior mold assembly to compression mold, within said interior mold assembly, said spout with an internal surface of predetermined diameter, and to compression mold, between said interior mold assembly and said exterior mold assembly, said web and said cylindrical wall;
(e) forming a neck portion having a cylindrical internal diameter no greater than said predetermined diameter; and
(f) expanding said length to form said body portion integral and in situ with and depending from said neck portion.

7. A process for forming a one-piece self-draining plastic container having a body portion and an integrally formed dispensing portion including an upwardly extending dispensing spout having a circumferential extent less than 360° defining an opening, a web joined to and extending outwardly from the lower end of said dispensing spout, and a cylindrical wall joined to and extending upwardly from said web spaced outwardly of and encircling said dispensing spout, said dispensing spout, said cylindrical wall and said web cooperating to define a channel into which liquid draining down the outside of said dispensing spout may be captured, said spout opening communicating with said body portion and permitting liquid in said channel to flow into said body, comprising the steps of:
(a) providing
  (i) an interior mold assembly having an interior core pin, a sleeve encircling said core pin and cooperating therewith to define a cavity conforming to the desired configuration of said spout; and
  (ii) an exterior mold assembly cooperating with said sleeve to define a cavity conforming to the desired configuration of said cylindrical wall and said web;
(b) compression molding heated and plasticized thermoplastic material into said cavities defined by said interior mold assembly and said exterior mold assembly to form said dispensing spout and cylindrical wall joined by said web, said dispensing spout having an internal surface of predetermined diameter;
(c) compression molding a neck portion having a cylindrical internal surface no greater than said predetermined diameter;
(d) providing a blowable parison integral with and depending from said neck portion;
(e) enclosing said blowable parison within the body forming cavity of a mold;
(f) expanding said blowable parison within said body forming cavity to form the body portion of said container integral and in situ with and depending from said neck portion; and
(g) removing said container from said body forming cavity, said exterior mold assembly and said interior mold assembly.

8. The process according to claim 7, wherein step (d) is performed by extrusion.

9. The process as defined in claim 7, wherein the step of forming said neck portion provides a cylindrical internal surface having a diameter smaller than said predetermined diameter.

* * * * *